US010122293B2

(12) United States Patent
Chen et al.

(10) Patent No.: US 10,122,293 B2
(45) Date of Patent: Nov. 6, 2018

(54) POWER MODULE PACKAGE HAVING A MULTI-PHASE INVERTER AND POWER FACTOR CORRECTION

(71) Applicant: Infineon Technologies Americas Corp., El Segundo, CA (US)

(72) Inventors: Zhou Chen, Seal Beach, CA (US); Toshio Takahashi, Rancho Palos Verdes, CA (US)

(73) Assignee: INFINEON TECHNOLOGIES AMERICAS CORP., El Segundo, CA (US)

( * ) Notice: Subject to any disclaimer, the term of this patent is extended or adjusted under 35 U.S.C. 154(b) by 612 days.

(21) Appl. No.: 13/707,221

(22) Filed: Dec. 6, 2012

(65) Prior Publication Data

US 2013/0182470 A1    Jul. 18, 2013

Related U.S. Application Data

(60) Provisional application No. 61/587,497, filed on Jan. 17, 2012.

(51) Int. Cl.
| H02M 7/537 | (2006.01) |
| H02M 1/42 | (2007.01) |
| H02H 7/122 | (2006.01) |
| H02M 1/00 | (2006.01) |

(52) U.S. Cl.
CPC ......... *H02M 7/537* (2013.01); *H02M 1/4225* (2013.01); *H02H 7/122* (2013.01); *H02M 2001/007* (2013.01); *Y02B 70/126* (2013.01); *Y02P 80/112* (2015.11)

(58) Field of Classification Search
CPC ...... H01L 2924/00; H01L 2924/13091; H02M 7/537; H02M 7/122; H02M 1/4225; H02M 2001/007; Y02P 80/112; Y02B 70/126
USPC ......................................................... 363/147
See application file for complete search history.

(56) References Cited

U.S. PATENT DOCUMENTS

| 7,554,817 | B2 * | 6/2009 | Nakakita et al. | ............. 361/775 |
| 2004/0047166 | A1 * | 3/2004 | Lopez-Santillana | ......................... H02M 1/4225 363/89 |
| 2004/0124785 | A1 * | 7/2004 | Alexandrov | ................... 315/291 |
| 2005/0204760 | A1 * | 9/2005 | Kurita et al. | ................. 62/228.1 |
| 2008/0061048 | A1 * | 3/2008 | Borowy et al. | ............. 219/130.1 |
| 2009/0129128 | A1 * | 5/2009 | Hirahara | ......................... 363/49 |
| 2009/0166850 | A1 * | 7/2009 | Jeon | ........................ H01L 24/37 257/706 |
| 2011/0031911 | A1 * | 2/2011 | Marcinkiewicz | ... H02M 1/4225 318/400.3 |

(Continued)

*Primary Examiner* — Jue Zhang
(74) *Attorney, Agent, or Firm* — Slater Matsil, LLP

(57) ABSTRACT

According to an exemplary implementation, a power module package includes a multi-phase inverter. The power module package also includes a multi-phase inverter driver configured to drive the multi-phase inverter. The power module package further includes a power factor correction (PFC) circuit where the PFC circuit is configured to regulate a bus voltage of the multi-phase inverter and a PFC driver configured to drive the PFC circuit. The multi-phase inverter, the multi-phase inverter driver, the PFC circuit, and the PFC driver are situated on a package substrate of the power module package. The multi-phase inverter driver and the PFC driver can be in a common driver integrated circuit (IC).

21 Claims, 4 Drawing Sheets

(56) References Cited

U.S. PATENT DOCUMENTS

2012/0168919 A1* 7/2012 Eom .................. H01L 23/3735
257/675
2013/0106365 A1* 5/2013 Ang ..................... B60L 3/0069
320/138

* cited by examiner

POWER MODULE PACKAGE HAVING A MULTI-PHASE INVERTER AND POWER FACTOR CORRECTION

The present application claims the benefit of and priority to a provisional patent application entitled "Power Factor Correction Plus Three-Phase AC Inverter Intelligent Power Module," Ser. No. 61/587,497 filed on Jan. 17, 2012. The disclosure in that provisional application is hereby incorporated fully by reference into the present application.

BACKGROUND

A voltage regulator can include a power factor correction (PFC) circuit so that a load, connected to an output of the voltage regulator, appears more like a resistive load at an input of the voltage regulator (i.e. so that the voltage regulator has a high power factor). In order to achieve a high power factor for a voltage regulator, input current of the voltage regulator should be substantially in phase with and substantially match a shape of input voltage of the voltage regulator. The voltage regulator can also include a multi-phase inverter for regulating the input voltage and various related support circuitry. The multi-phase inverter and the PFC circuit have traditionally been housed in separate packages, which are connected to one another in a voltage regulator circuit.

SUMMARY

A power module package having a multi-phase inverter and power factor correction, substantially as shown in and/or described in connection with at least one of the figures, and as set forth more completely in the claims.

DETAILED DESCRIPTION

Figure 1:
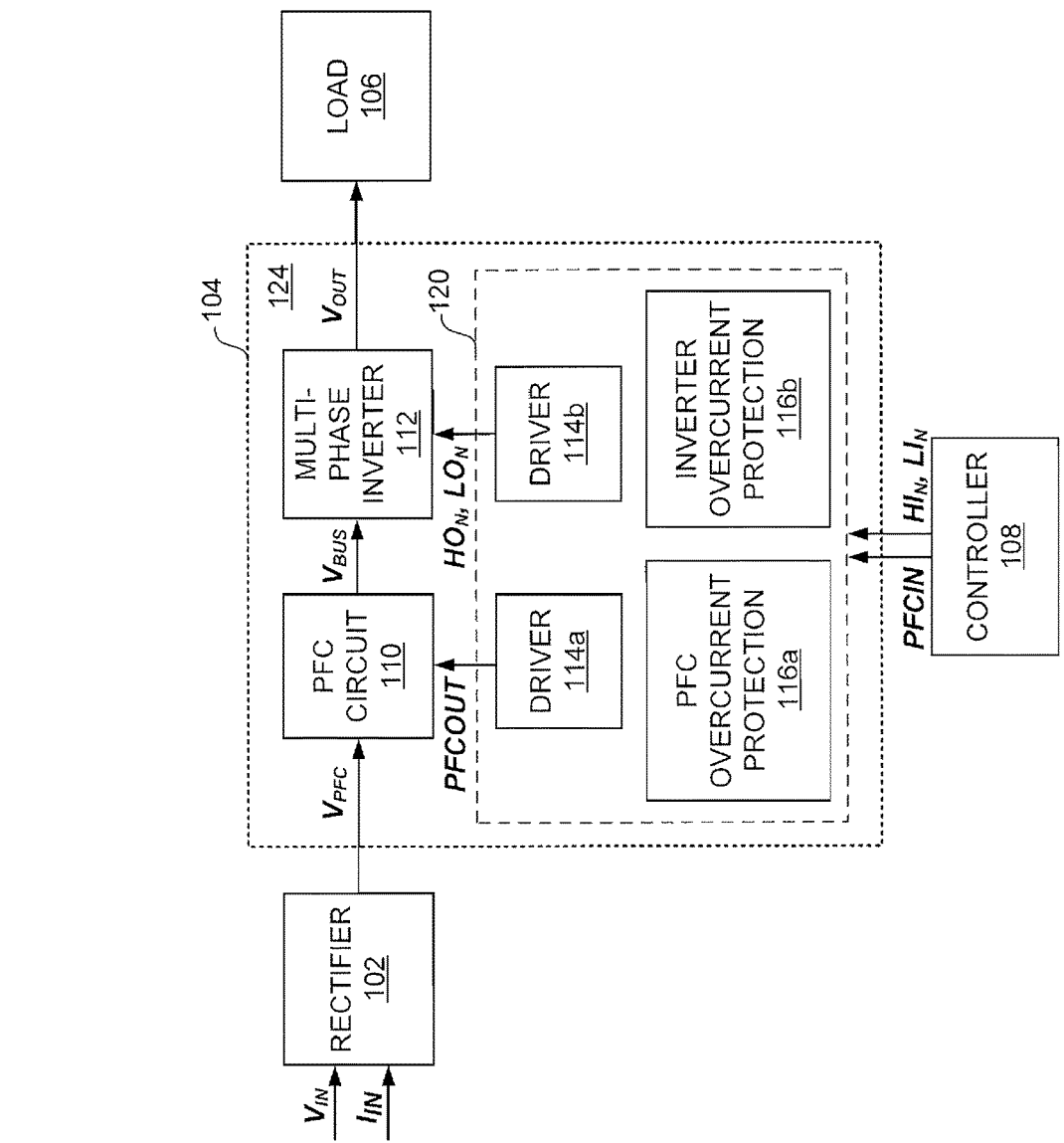
FIG. 1 illustrates a schematic diagram of an exemplary voltage regulator circuit.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates a schematic diagram of voltage regulator circuit 100. Voltage regulator circuit 100 includes power module package 104 coupled to rectifier 102 and load 106 coupled to power module package 104. Voltage regulator circuit 100 also includes controller 108 (e.g. a microcontroller) coupled to power module package 104. Power module package 104 includes power factor correction (PFC) circuit 110, multi-phase inverter 112, PFC circuit driver 114a (also referred to simply as "PFC driver"), and multi-phase inverter driver 114b. Power module package 104 also optionally includes additional circuitry, such as PFC overcurrent protection circuit 116a and inverter overcurrent protection circuit 116b.

In some implementations, PFC circuit driver 114a, multi-phase inverter driver 114b, PFC overcurrent protection circuit 116a, inverter overcurrent protection circuit 116b, and/or other circuitry are in driver integrated circuit (IC) 120 (i.e. a common driver IC). However, in various implementations, any of PFC circuit driver 114a, multi-phase inverter driver 114b, PFC overcurrent protection circuit 116a, inverter overcurrent protection circuit 116b, and/or other circuitry are separate from one another within power module package 104.

Rectifier 102 is configured to receive input voltage $V_{IN}$ and to provide PFC input voltage $V_{PFC}$ to power module package 104. Input voltage $V_{IN}$ can be, for example, an alternating current (AC) input voltage, such as an AC line input voltage. PFC input voltage $V_{PFC}$ can be, for example, a full-wave rectified version of input voltage $V_{IN}$. Power module package 104 is configured to receive PFC input voltage $V_{PFC}$ from rectifier 102 and to provide regulated output voltage $V_{OUT}$ to load 106. Load 106 is configured to receive regulated output voltage $V_{OUT}$ from power module package 104.

Power module package 104 is configured to generate regulated output voltage $V_{OUT}$ from PFC input voltage $V_{PFC}$. In power module package 104, PFC circuit 110 is configured to receive PFC input voltage $V_{PFC}$ and to regulate bus voltage $V_{BUS}$ of multi-phase inverter 112, which is generated from PFC input voltage $V_{PFC}$. In order to achieve a high power factor for voltage regulator circuit 100, input current $I_{IN}$ should be substantially in phase with and substantially match a shape of input voltage $V_{IN}$. Thus, PFC circuit 100 may adjust the phase and/or shape of input current $I_{IN}$ accordingly. PFC circuit 110 can thereby provide power factor correction so that load 106, appears more like a resistive load (i.e. so that voltage regulator circuit 100 has a high power factor).

PFC circuit 110 can be various types of PFC circuits, but is generally an active PFC circuit. Thus, power module package 104 includes PFC circuit driver 114a, which is configured to drive PFC circuit 110. As shown in FIG. 1, PFC circuit driver 114a is configured to provide one or more drive signals, such as PFC drive signal PFCOUT to PFC circuit 100 so as to drive PFC circuit 110. In the present implementation, power module package 104 is configured to generate PFC drive signal PFCOUT from PFC control signal PFCIN. For example, controller 108 is configured to provide PFC control signal PFCIN to driver IC 120, which generates PFC drive signal PFCOUT from PFC control signal PFCIN. Generating PFC drive signal PFCOUT can include level shifting PFC control signal PFCIN and may be subject to various conditions, such as overcurrent and under-voltage conditions. As one example, in the present implementation, power module package 104 includes PFC overcurrent protection circuit 116a, which is configured to provide overcurrent protection to PFC circuit 110.

In voltage regulator circuit 100, multi-phase inverter 112 is configured to receive bus voltage $V_{BUS}$ from PFC circuit 110 and to generate regulated output voltage $V_{OUT}$ from bus voltage $V_{BUS}$. Multi-phase inverter 112 includes at least two phases, and thus, regulated output voltage $V_{OUT}$ includes at least two phase outputs (not specifically shown in FIG. 1). For example, in the present implementation, multi-phase inverter 112 is a three-phase inverter that provides U-phase, V-phase, and W-phase outputs to load 106. Load 106 can thereby be powered by regulated output voltage $V_{OUT}$. An example of load 106 is an electric motor.

Power module package 104 includes multi-phase inverter driver 114b that is configured to drive multi-phase inverter 112. As shown in FIG. 1, multi-phase inverter driver 114b is configured to provide drive signals to multi-phase inverter 112 so as to drive multi-phase inverter 112. For example, multi-phase inverter driver 114b is shown as providing N high side drive signals $HO_N$ and N low side drive signals $LO_N$ to multi-phase inverter 112. High side drive signals $HO_N$ are configured to drive respective high side power switches in multi-phase inverter 112. Similarly, low side drive signals $LO_N$ are configured to drive respective low side power switches in multi-phase inverter 112.

In the present implementation, power module package 104 is configured to generate high side drive signals $HO_N$ and low side drive signals $LO_N$ from respective high side control signals $HI_N$ and low side control signals $LI_N$. For example, controller 108 is configured to provide high side control signals $HI_N$ and low side control signals $LI_N$ to driver IC 120, which generates high side drive signals $HO_N$ and low side drive signals $LO_N$ from respective high side control signals $HI_N$ and low side control signals $LI_N$. Generating high side drive signals $HO_N$ and low side drive signals $LO_N$ can include level shifting high side control signals $HI_N$ and/or low side control signals $LI_N$ and may be subject to various conditions, such as overcurrent and under-voltage conditions. As one example, in the present implementation, power module package 104 includes inverter overcurrent protection circuit 116b, which is configured to provide overcurrent protection to multi-phase inverter 112.

Multi-phase inverter 112 and PFC circuit 110 have traditionally been housed in separate packages, which are connected to one another. However, power module package 104 can include both multi-phase inverter 112 and PFC circuit 110. In doing so, power module package 104 can provide voltage regulator circuit 100 with a small footprint, simplified interconnects, and high performance. This can be achieved while providing power module package 104 with high functionality including various related support circuitry. For example, in accordance with various implementations, power module package 104 includes multi-phase inverter 112, multi-phase inverter driver 114b, PFC circuit 110, PFC circuit driver 114a, PFC overcurrent protection circuit 116a, and inverter overcurrent protection circuit 116b situated on package substrate 124 of power module package 104.

In some implementations, power module package 104 is realized, for example, utilizing driver IC (e.g. a common driver IC) 120 that is configured to drive multi-phase inverter 112 and PFC circuit 110. Driver IC 120 can offer a compact configuration of power module package 104 while accommodating robust features in a small form factor. Driver IC 120 is shown as being situated on package substrate 124, which can be, as examples, an insulated metal substrate (IMS), a leadframe-based substrate, a direct bonded copper (DBC) substrate, a glass epoxy substrate, or other package substrate.

Figure 2A:
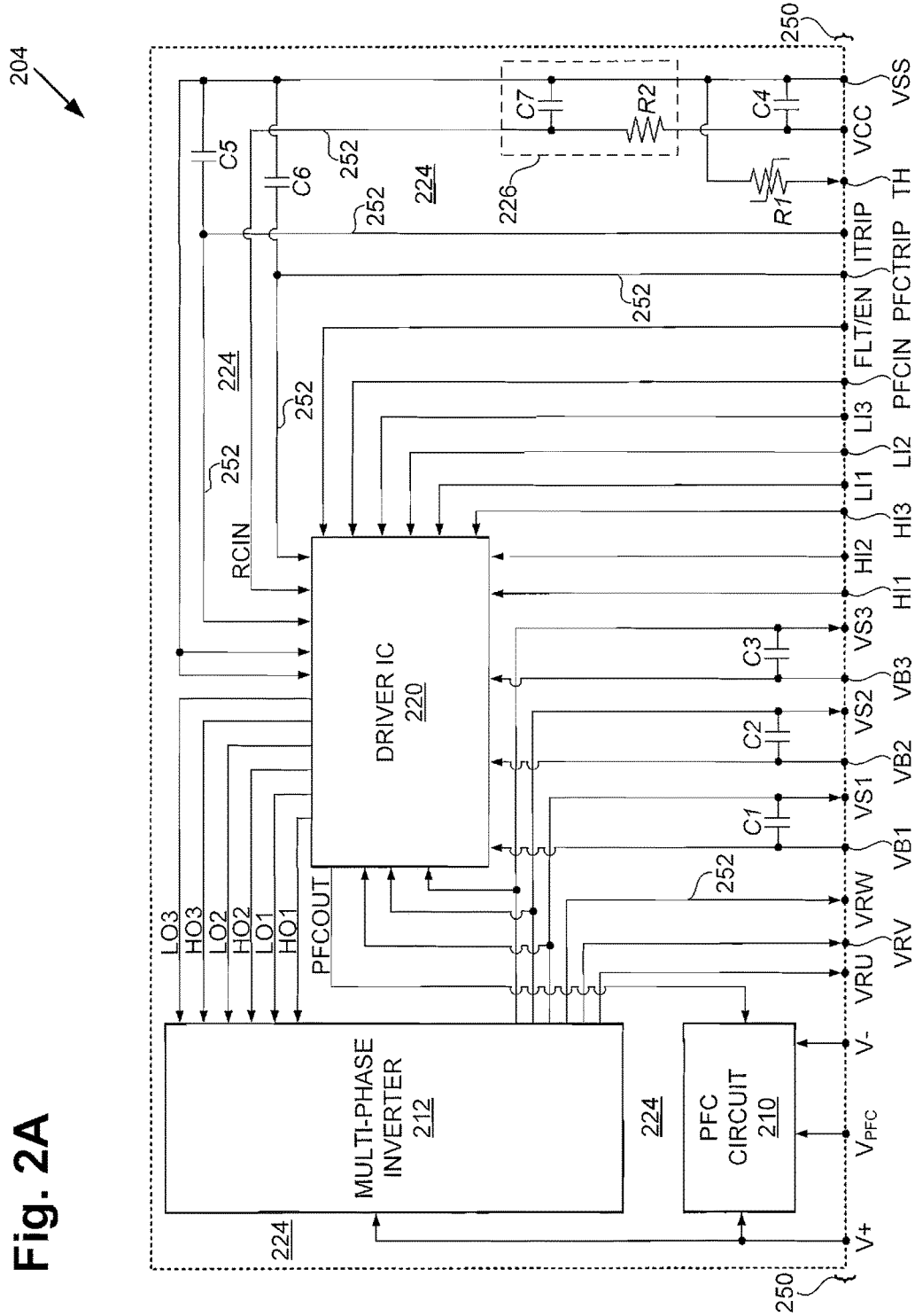
FIG. 2A illustrates a schematic diagram of an exemplary power module package.

FIG. 2A illustrates a schematic diagram of power module package 204 corresponding to power module package 104 in FIG. 1. Power module package 204 includes driver IC 220 (e.g. a common driver IC), multi-phase inverter 212 (e.g. a three-phase inverter), PFC circuit 210 (e.g. a boot PFC circuit), reset timing circuit 226, capacitors C1, C2, C3, C4, C5, and C6, and thermistor R1 situated on package substrate 224 of power module package 204. Reset timing circuit 226 includes resistor R2 and capacitor C7. In power module package 204, PFC circuit 210, multi-phase inverter 212, driver IC 220, and package substrate 224 correspond respectively to PFC circuit 110, multi-phase inverter 112, driver IC 120, and package substrate 124 in FIG. 1. Power module package 204 can have additional components not specifically shown in FIG. 2A.

Power module package 204 has I/O terminals 250, which are configured for respective connection to high side bus voltage V+, PFC input voltage $V_{PFC}$, low side voltage V− (e.g. a ground), low side inverter connections VRU, VRV, VRW, bootstrap voltages VB1, VB2, and VB3, output voltages VS1, VS2, and VS3, high side control signals HI1, HI2, and HI3, low side control signals LI1, LI2, and LI3, PFC control signal PFCIN, fault/enable signal FLT/EN, PFC overcurrent signal PFCITRIP, inverter overcurrent signal ITRIP, thermistor signal TH, supply voltage VCC, and ground VSS, as shown in FIG. 2A.

Power module package 204 further includes various internal connections 252, such as those for high side drive signals HO1, HO2, and HO3, low side drive signals LO1, LO2, and LO3, PFC drive signal PFCOUT, and overcurrent reset signal RCIN. Internal connections 252 can include, for example, any combination of conductive traces on package substrate 224, wirebonds, conductive clips, and conductive vias.

In power module package 204, driver IC 220 and reset timing circuit 226 are configured to receive supply voltage VCC. Supply voltage VCC can be, for example, 15 volts with respect to ground VSS. Driver IC 220 and reset timing circuit 226 are powered by supply voltage VCC. Driver IC 220 and reset timing circuit 226 are also configured to receive ground VSS. Thermistor R1 is configured to receive ground VSS and is configured to generate thermistor signal TH for temperature sensing.

Driver IC 220 is configured to drive multi-phase inverter 212 and PFC circuit 210. In FIG. 2A, PFC input voltage $V_{PFC}$, PFC drive signal PFCOUT, and PFC control signal PFCIN correspond respectively to PFC input voltage $V_{PFC}$, PFC drive signal PFCOUT, and PFC control signal PFCIN in FIG. 1. Also, in FIG. 2A, high side bus voltage V+ corresponds to bus voltage $V_{BUS}$ in FIG. 1.

Figures 2B, 2C:
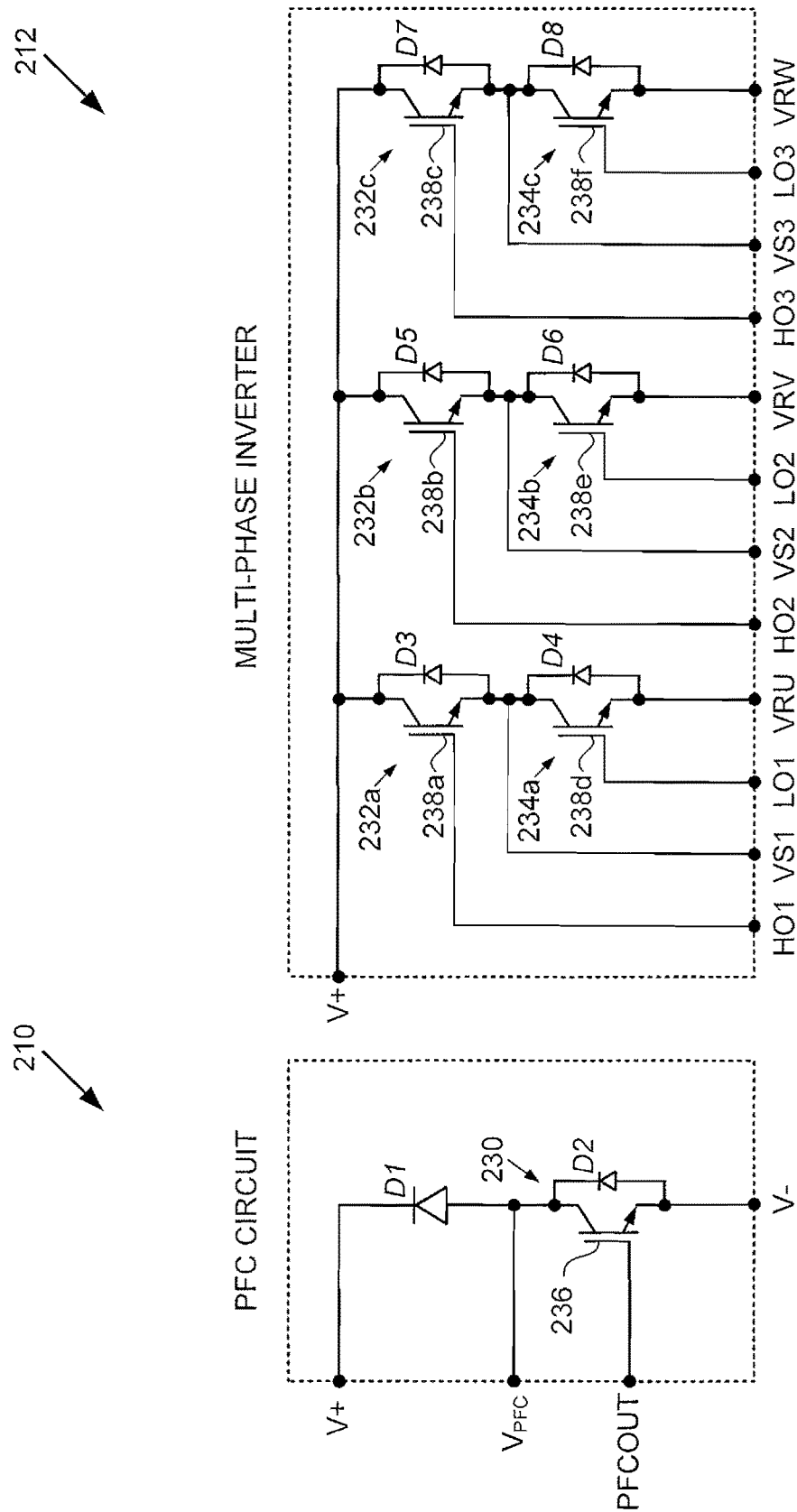
FIG. 2B illustrates a schematic diagram of an exemplary power factor correction circuit of a power module package.
FIG. 2C illustrates a schematic diagram of an exemplary multi-phase inverter of a power module package.

Referring now to FIG. 2B, FIG. 2B illustrates a schematic diagram of power factor correction circuit 210 of power module package 204. The implementation shown in FIG. 2B is an active PFC having PFC switch 230 in cascode with PFC diode D1. PFC switch 230 includes PFC transistor 236 and diode D2, which is connected antiparallel with PFC transistor 236. In some implementations, diode D2 is monolithically formed with PFC transistor 236, but in other implementations, diode D2 and PFC transistor 236 are separate components of power module package 204. In various implementations, PFC switch 230 includes, for example, any of a metal-oxide-semiconductor field-effect transistor (MOSFET), an insulated-gate bipolar transistor (IGBT), a fast-recovery epitaxial diode field-effect transistor (FREDFET), and a high electron mobility transistor (HEMT). In the implementation shown, PFC transistor 236 is an IGBT.

Figure 2D:
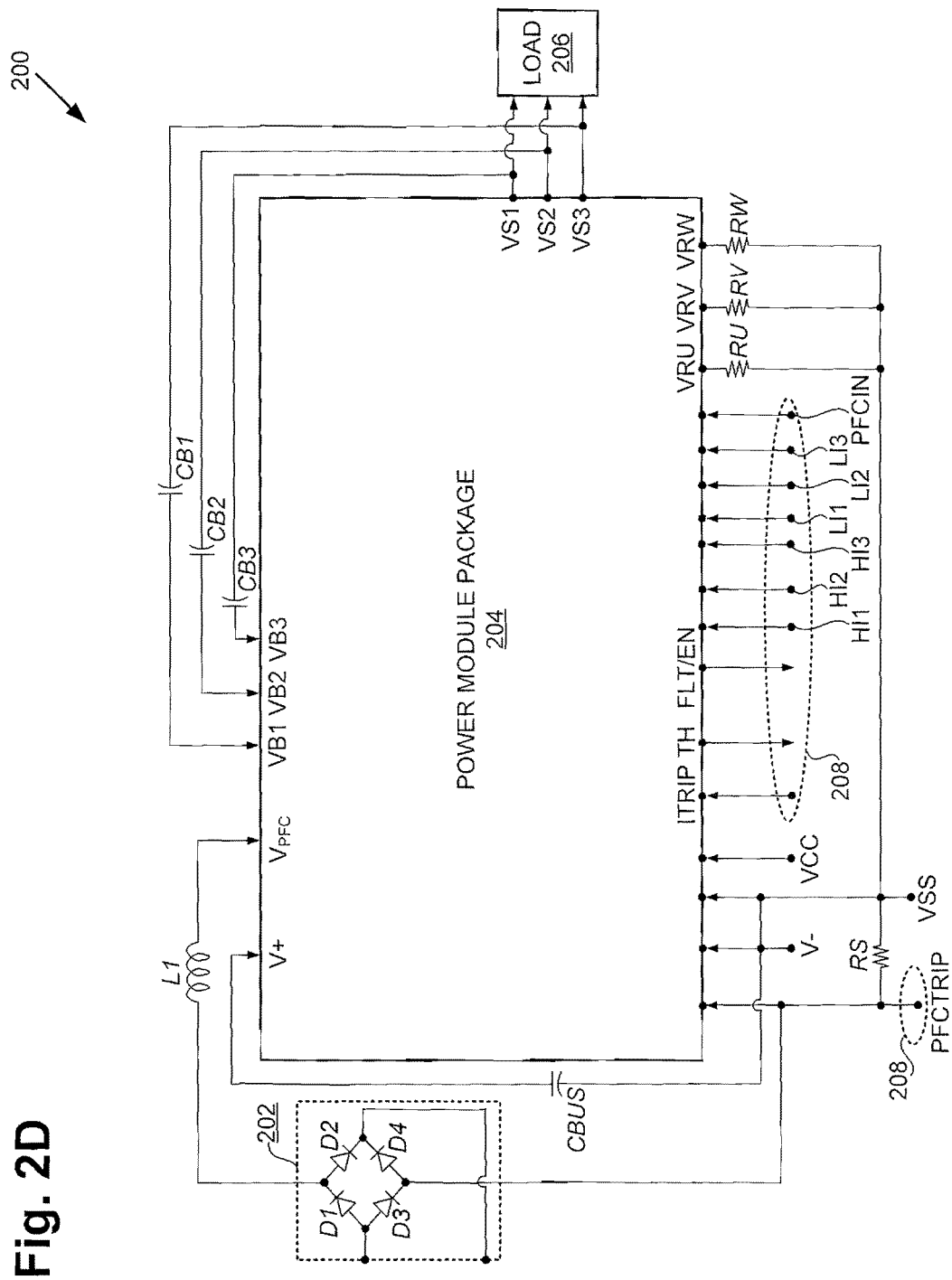
FIG. 2D illustrates a schematic diagram of an exemplary power module package in a voltage regulator circuit.

PFC circuit 210 is configured to regulate high side bus voltage V+ of multi-phase inverter 212, which is generated from PFC input voltage $V_{PFC}$. Referring now to FIG. 2D, FIG. 2D illustrates a schematic diagram of power module package 204 in voltage regulator circuit 200. Voltage regulator circuit 200 corresponds to voltage regulator circuit 100 in FIG. 1. Furthermore, rectifier 202, load 206, and controller 208 respectively correspond to rectifier 102, load 106, and controller 108 in FIG. 1. FIG. 2D represents one manner in which connection can be made to power module package 204. As shown in FIG. 2D, bus capacitor CBUS is coupled across power module package 204 and is utilized to provide high side bus voltage V+. Bus capacitor CBUS is also coupled to ground VSS and low side voltage V−. PFC input voltage $V_{PFC}$ is provided to power module package 204 by rectifier 202 through inductor L1. Rectifier 202 is a full-bridge rectifier and includes diodes D1, D2, D3, and D4.

I the present implementation, PFC circuit 210 is a boost PFC and may utilize full and/or partial switching of PFC switch 230. Driver IC 220 (e.g. PFC circuit driver 114a of FIG. 1) is configured to drive PFC switch 230 of PFC circuit 210. More particularly, driver IC 220 is configured to drive PFC switch 230 of PFC circuit 210 by providing PFCOUT to a gate of PFC transistor 236. An exemplary switching frequency for PFC circuit 210 is approximately 18 kHz or less.

Referring again to FIG. 2A, high drive signals HO1, HO2, and HO3 correspond collectively to high side drive signals $HO_N$ in FIG. 1. Also, high side control signals HI1, HI2, and HI3 in FIG. 2A correspond collectively to high side control signals $HI_N$ in FIG. 1. Similarly, low drive signals LO1, LO2, and LO3 in FIG. 2A correspond collectively to low side drive signals $LO_N$ in FIG. 1 and low side control signals LI1, LI2, and LI3 in FIG. 2A correspond collectively to low side control signals $LI_N$ in FIG. 1.

Output voltages VS1, VS2, and VS3 in FIG. 2A correspond collectively to regulated output voltage $V_{OUT}$ in FIG. 1. As shown in FIG. 2D, load 206 is configured to receive output voltages VS1, VS2, and VS3. Also shown in FIG. 2D, bootstrap capacitors CB1, CB2, and CB3 are coupled across power module package 204. Bootstrap capacitors CB1, CB2, and CB3 are connected to output voltages VS1, VS2, and VS3 and provide bootstrap voltages VB1, VB2, and VB3 to power module package 204. As shown in FIG. 2A, driver IC 220 is configured to receive bootstrap voltages VB1, VB2, and VB3. Driver IC 220 is configured to utilize bootstrap voltages VB1, VB2, and VB3 to power drivers for multi-phase inverter 212.

Referring now to FIG. 2C, FIG. 2C illustrates a schematic diagram of multi-phase inverter 212 of power module package 204. Multi-phase inverter 212 is a three-phase inverter including U-phase, V-phase, and W-phase circuits. The U-phase circuit includes U-phase power switches 232a and 234a. The V-phase circuit includes V-phase power switches 232b and 234b. The W-phase circuit includes W-phase power switches 232c and 234c. U-phase power switch 232a, V-phase power switch 232b, and W-phase power switch 232c are also referred to as high side power switches 232. U-phase power switch 234a, V-phase power switch 234b, and W-phase power switch 234c are also referred to as low side power switches 234. Thus, the U-phase, V-phase, and W-phase circuits each respectively comprise a high side power switch 232 and a low side power switch 234. As shown in FIG. 2C, each high side power switch 232 is coupled to a respective low side power switch 234 with a respective one of output voltages VS1, VS2, and VS3 therebetween. While multi-phase inverter 212 is a three-phase inverter, multi-phase inverter 212 is a two-phase inverter in some implementations.

In the implementation shown in FIG. 2C, high side power switches 232 and low side power switches 234 include power transistors 238a, 238b, 238c, 238d, 238e, and 238f, which are also referred to as power transistors 238. High side power switches 232 and low side power switches 234 also include diodes D3, D4, D5, D6, D7, and D8. As shown in FIG. 2C, in each of high side power switches 232 and low side power switches 234 a respective one of diodes D3, D4, D5, D6, D7, and D8 is connected antiparallel with a respective one of power transistors 238 (e.g. diode D3 is connected antiparallel with power transistor 238a). In some implementations, the respective one of diodes D3, D4, D5, D6, D7, and D8 is monolithically formed with the respective one of power transistors 238, but in other implementations, the respective one of diodes D3, D4, D5, D6, D7, and D8 is a separate component of power module package 204. In various implementations, high side power switches 232 and low side power switches 234 can include, for example, any of a MOSFET, an IGBT, a FREDFET, and HEMT. In the implementation shown, power transistors 238 are IGBTs.

Driver IC 220 is configured to drive the U-phase, V-phase, and W-phase circuits and PFC circuit 210. More particularly, to drive the U-phase, V-phase, and W-phase circuits by respectively providing high side drive signals HO1, HO2, and HO3, and low side drive signals LO1, LO2, and LO3 to gates of power transistors 238. Although not shown, internal connections 252 for high side drive signals HO1, HO2, and HO3, and low side drive signals LO1, LO2, and LO3 can include respective gate resistors on package substrate 224. An exemplary switching frequency for multi-phase inverter 212 is approximately 6 kHz or less.

As can be seen in FIG. 2C, collectors/drains of high side power switches 232 are shorted within power module package 204. However, emitters/sources of low side power switches 234 are provided at I/O terminals 250 as low side inverter connections VRU, VRV, and VRW, and power module package 204 is thereby an open source package. It is noted that in some implementations, emitters/sources of low side power switches 234 are shorted within power module package 204. However, the open source implementation allows for flexibility in connecting to power module package 204.

As shown in FIG. 2D, low side inverter connections VRU, VRV, and VRW are coupled to ground VSS through resistors RU, RV, and RW respectively. Low side inverter connections VRU, VRV, and VRW can be utilized to generate inverter overcurrent signal. ITRIP to provide inverter overcurrent protection to power module package 204. For example inverter overcurrent signal ITRIP can be compared to a reference value by an inverter overcurrent protection circuit in power module package 204 (e.g. inverter overcurrent protection circuit 116b, which can be in driver IC 220). If inverter overcurrent signal ITRIP exceeds the reference value, driver IC 220 (e.g. inverter overcurrent protection circuit 116b) detects an overcurrent condition in multi-phase inverter 212. Driver IC 220 is configured to indicate the inverter overcurrent condition to, for example, controller 208, by providing fault/enable signal FLT/EN to controller 208.

Reset timing circuit 226 is configured to signal reset of overcurrent protection of multi-phase inverter 212 by generating RCIN. For example, driver IC 220 (more particularly inverter overcurrent protection circuit 116b) is configured to utilize RCIN to automatically reset from overcurrent protection of multi-phase inverter 212. As shown in FIG. 2A, resistor R2 is coupled to supply voltage VCC and capacitor C7 is coupled between resistor R2 and ground VSS to charge capacitor C7. Resistor R2 and capacitor C7 can be changed to alter timing of automatic reset for the overcurrent protection of multi-phase inverter 212.

The voltage across shunt resistor RS, shown in FIG. 2D can be utilized to generate PFC overcurrent signal PFCTRIP to provide PFC overcurrent protection to power module package 204. PFC overcurrent signal PFCTRIP can be compared to a reference value by a PFC overcurrent protection circuit in power module package 204 (e.g. PFC overcurrent protection circuit 116a, which can be in driver IC 220). If PFC overcurrent signal PFCTRIP exceeds the reference value, driver IC 220 (more particularly PFC overcurrent protection circuit 116a) detects an overcurrent condition in multi-phase inverter 212. Driver IC 220 is configured to indicate the PFC overcurrent condition to, for example, controller 208, by providing fault/enable signal FLT/EN to controller 208.

Reset timing circuit 226 is configured to signal reset of overcurrent protection of ITC circuit 210 by generating RCIN. For example, driver IC 220 (e.g. of PFC overcurrent protection circuit 116a in FIG. 1) is configured to utilize RCIN to automatically reset from overcurrent protection of PFC circuit 210. Thus, as described above, in some implementations, reset timing circuit 226 is a common reset timing circuit that is configured to signal reset of overcurrent protection of PFC circuit 210 and multi-phase inverter 212. While separate reset timing circuits can be utilized in some implementations, a common reset timing circuit can reduce components and simplify internal connections 252 in power module package 204, amongst other advantages.

In the present implementation, I/O terminal 250 of power module package 204 for fault/enable signal FLT/EN, shown in FIG. 2A, is a common fault terminal of power module package 204 that is configured to indicate an overcurrent condition of PFC circuit 210 and is configured to indicate an overcurrent condition of multi-phase inverter 212. Driver IC 220 is configured to indicate an overcurrent condition of PFC circuit 210 and multi-phase inverter 212 through the common fault terminal of power module package 204 utilizing fault/enable signal FLT/EN.

Fault/enable signal FLT/EN is labeled as such because in the present implementation, fault/enable signal FLT/EN is for a FAULT (FLT) signal (for multi-phase inverter circuit 212 and/or PFC circuit 210) and at least one ENABLE/DISABLE (EN) signal. Driver IC 220 is configured to disable or enable switching of PFC circuit 210 and/or multi-phase inverter 212 responsive to the ENABLE/DISABLE signal from the common fault terminal of power module package 204. Thus, controller 208 can utilize the at least one ENABLE/DISABLE signal to enable or disable switching of multi-phase inverter circuit 212 and/or PFC circuit 210 by driver IC 220 (more particularly switching by multi-phase inverter driver 114b and/or PFC circuit driver 114a). Thus, the I/O terminal 250 for fault/enable signal FLT/EN, shown in FIG. 2A, can also be a common enable terminal of power module package 204 that is configured for enabling or disabling switching of PFC circuit 210 and multi-phase inverter 212.

Thus, as described above, the I/O terminal 250 is a common fault terminal for PFC circuit 210 and multi-phase inverter 212 and a common enable terminal for PFC circuit 210 and multi-phase inverter 212. However, in some implementations, power module package 204 has a common enable terminal that is separate from a common fault terminal. Furthermore, power module package 204 may have separate enable terminals and/or separate fault terminals. However, utilizing common enable and/or fault terminals can significantly reduce a number of terminals of power module package as well as simplify routing. For example, the I/O terminal 250 shown in FIG. 2A can replace four dedicated terminals for fault/enable signals.

Thus, as described above with respect to FIGS. 1 and 2A through 2D, in accordance with various implementations, a power module package includes a multi-phase inverter, a multi-phase inverter driver, a PFC circuit, and a PFC circuit driver situated on a package substrate of the power module package. In doing so, the power module package can provide for a voltage regulator circuit having a small footprint, simplified interconnects, and high performance. The multi-phase inverter driver and the PFC circuit driver can be in separate ICs. However, in various implementations, a power module package includes a common driver IC configured to drive U-phase, V-phase, and W-phase circuits and a PFC circuit. Amongst other advantages, this can offer a compact configuration of the power module package while accommodating robust features in a small form factor.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:
1. A power module package comprising:
a multi-phase inverter;
a power factor correction (PFC) circuit, said PFC circuit configured to regulate a bus voltage of said multi-phase inverter;
a common driver integrated circuit (IC) comprising a multi-phase inverter driver and a PFC driver, wherein the multi-phase inverter driver is configured to drive the multi-phase inverter, wherein the PFC driver is configured to drive said PFC circuit,
said common driver IC, said multi-phase inverter, and said PFC circuit are disposed on a single substrate of said power module package, and
said PFC circuit comprises a diode connected antiparallel with a PFC switch;
a first external input terminal internally coupled to both the PFC circuit and the multi-phase inverter, the first external input terminal being configured to receive a high side DC voltage;
a second external input terminal internally coupled to the PFC circuit and configured to receive a low side DC voltage;
a third external input terminal internally coupled to the PFC circuit and configured to receive a PFC input voltage, wherein the PFC input voltage is a rectified version of an AC input voltage; and
a plurality of external output terminals configured to output a multi-phase output, the plurality of external output terminals being coupled to the multi-phase inverter, wherein the first external input terminal, the second external input terminal, the third external input terminal, and the plurality of external output terminals are external connections of the power module package.
2. The power module package of claim 1, comprising a PFC overcurrent protection circuit configured to provide over current protection to said PFC circuit, wherein the multi-phase inverter driver, the PFC driver, and the PFC overcurrent protection circuit are disposed in the common driver IC.

3. The power module package of claim 1, comprising an inverter overcurrent protection circuit configured to provide over current protection to said multi-phase inverter, wherein the multi-phase inverter driver, the PFC driver, and the inverter overcurrent protection circuit are disposed in the common driver IC.

4. The power module package of claim 1, wherein said multi-phase inverter is a three-phase inverter.

5. The power module package of claim 1, comprising a common fault terminal of said power module package configured to
   indicate an overcurrent condition of said PFC circuit,
   indicate an overcurrent condition of said multi-phase inverter, and
   enable or disable switching of said PFC circuit and said multi-phase inverter.

6. The power module package of claim 1, wherein the single substrate is an insulated metal substrate (IMS).

7. The power module package of claim 1, wherein said PFC driver is configured to drive said PFC switch of said PFC circuit.

8. The power module package of claim 1, wherein the single substrate is a direct bonded copper (DBC) substrate.

9. The power module package of claim 1, wherein the single substrate is a leadframe-based substrate.

10. The power module package of claim 1, further comprising a plurality of inverter terminals, wherein:
    the multi-phase inverter comprises a plurality of high side switches and a plurality of low side switches;
    each of the plurality of low side switches comprises a first connection and a second connection;
    each of the plurality of high side switches are coupled to the first connection of a respective low side switch of the plurality of low side switches;
    each of the plurality of inverter terminals is coupled to the second connection of a respective low side switch of the plurality of low side switches; and
    each of the plurality of inverter terminals is and external connection of the power module package.

11. The power module package of claim 1, further comprising:
    a plurality of inverter connections coupled to the multi-phase inverter, the plurality of inverter connections being configured to provide overcurrent protection to the power module package, wherein each of the plurality of inverter connections is an external connection of the power module package.

12. A power module package comprising:
    a multi-phase inverter;
    a power factor correction (PFC) circuit configured to regulate a bus voltage of said multi-phase inverter;
    a common driver integrated circuit (IC) configured to drive said multi-phase inverter and said PFC circuit, wherein said multi-phase inverter, said PFC circuit, and said common driver IC are disposed on a single substrate of said power module package, and wherein said PFC circuit comprises a diode connected antiparallel with a PFC switch; and
    a common fault terminal coupled to the common driver IC, the common fault terminal configured to
      generate one or more fault signals at the common fault terminal,
      indicate an overcurrent condition of said PFC circuit using the one or more fault signals,
      indicate an overcurrent condition of said multi-phase inverter using the one or more fault signals, and
      enable or disable switching of said PFC circuit and said multi-phase inverter by receiving one or more enable/disable signals, wherein the common fault terminal is an external terminal of the power module package.

13. The power module package of claim 12, comprising a PFC overcurrent protection circuit in said common driver IC, wherein the common driver IC and the PFC overcurrent protection circuit are disposed in the common driver IC.

14. The power module package of claim 12, comprising an inverter overcurrent protection circuit in said common driver IC, wherein the common driver IC and the inverter overcurrent protection circuit are disposed in the common driver IC.

15. The power module package of claim 12, comprising a common reset timing circuit that is configured to signal reset of overcurrent protection of said PFC circuit and said multi-phase inverter.

16. The power module package of claim 12, wherein the single substrate is a leadframe-based substrate.

17. The power module package of claim 12, wherein the single substrate is an insulated metal substrate (IMS).

18. A power module package comprising:
    a three-phase inverter comprising U-phase, V-phase, and W-phase circuits;
    a power factor correction (PFC) circuit configured to regulate a bus voltage of said three-phase inverter;
    a common driver integrated circuit (IC) configured to drive said U-phase, V-phase, and W-phase circuits and said PFC circuit, wherein said three-phase inverter, said PFC circuit, and said common driver IC are disposed on a single substrate of said power module package, and wherein said PFC circuit comprises a diode connected antiparallel with a PFC switch;
    a first external input terminal internally coupled to both the PFC circuit and the three-phase inverter, the first external input terminal being configured to receive an external high side DC voltage;
    a second external input terminal internally coupled to the PFC circuit and configured to receive an external low side DC voltage;
    a third external input terminal internally coupled to the PFC circuit and configured to receive an external PFC input voltage, wherein the external PFC input voltage is a rectified version of an AC input voltage; and
    a plurality of external output terminals configured to output a multi-phase output, the plurality of external output terminals being coupled to the three-phase inverter.

19. The power module package of claim 18, wherein said common driver IC is configured to drive said PFC switch of said PFC circuit.

20. The power module package of claim 18, wherein said U-phase, V-phase, and W-phase circuits each respectively comprise a high side power switch and a low side power switch.

21. The power module package of claim 18, wherein said PFC circuit comprises a boost PFC.

* * * * *